United States Patent Office 3,738,980
Patented June 12, 1973

3,738,980
ANTIBIOTICALLY ACTIVE COMPOUNDS
Hans Bickel, Binningen, and Wilhelm Kump, Therwil, Switzerland, assignors to Ciba-Geigy Corporation, Summit, N.J.
No Drawing. Filed Aug. 6, 1970, Ser. No. 61,820
Claims priority, application Switzerland, Aug. 11, 1969, 12,131/69; Dec. 8, 1969, 18,249/69
Int. Cl. C07d 41/06
U.S. Cl. 260—239.3 P                14 Claims

ABSTRACT OF THE DISCLOSURE 3-amino-derivatives of 25–O-desacetyl rifamycin S or 25-O-desacetyl-rifamycin SV, or of derivatives thereof at least partially hydrogenated in positions 16, 17; 18, 19; 28, 29, such as the 16, 17, 18, 19-tetrahydro or the 16, 17, 18, 19, 28, 29-hexahydro-derivatives with an aza-cycloaliphatic ring in 3-position exhibit in addition to a very good action against gram-positive microorganisms an antibacterial action against rifampicin-resistant Staphylococci and corresponding mutants of *Mycobacterium tuberculosis*.

SUMMARY OF THE INVENTION

More particularly the present invention relates to 25-O-desacetyl-3-amino-rifamycin S, 25-O-desacetyl-3-amino-rifamycin SV and their derivatives hydrogenated at least in one of the 16, 17; 18, 19; 28, 29 positions, wherein the 3-amino group possesses aliphatic character and is disubstituted by a divalent hydrocarbon radical and wherein the aza-cyclo-aliphatic ring thus formed possesses at least 3 ring carbon atoms and only tetragonal α-carbon atoms and, if it has fewer than 8 ring carbon atoms, additionally possesses a further carbon-carbon bond starting from at least one of the positions other than the α-positions, their salts and quaternary ammonium compounds, as well as processes for their manufacture.

SPECIFIC EMBODIMENTS OF THE INVENTION

The divalent hydrocarbon radical substituting the $NH_2$ group of the said 25-O-desacetyl-3-amino-rifamycin S- and -SV derivatives and which together with the amine nitrogen forms an aza-cycloaliphatic ring can be a saturated or unsaturated alkylene group with a straight or branched carbon chain and with at least three ring carbon atoms, and this alkylene group can also be substituted by further aliphatic, cycloaliphatic, aromatic or araliphatic hydrocarbon radicals. Aliphatic hydrocarbon substituents are for example alkyl groups, especially lower alkyl, lower alkenyl or lower alkylidene groups, or alternatively straight-chain or branched, preferably lower, alkylene groups which can in turn be saturated or unsaturated and link two carbon atoms of the aza-cycloaliphatic ring. In the latter case a polycyclic-aza-cycloaliphatic radical is present, such as for example an aza-bicyclo- or aza-tricyclo-cycloalkane or -alkene. Such radicals can also be viewed as having been produced by linking two carbon atoms of a monocyclic aza-cycloaliphatic radical by means of an endocarbon-carbon bond. The alkylene radical can however also substitute the 2 hydrogen atoms of the same carbon atom of the aza-cycloaliphatic ring, whereby spirocyclic substituted derivatives are produced. Cycloaliphatic substituents are preferably cycloalkyl or cycloalkenyl groups with 3–8 ring carbon atoms which can in turn be substituted by alkyl, benzyl or phenyl or alkylene groups, that is to say in the latter instance represent bicyclic cycloaliphatic hydrocarbon radicals. Aromatic hydrocarbon radicals as substituents of the aza-cycloaliphatic ring may be monocyclic or polycyclic aryl radicals, especially a phenyl or naphthyl radical which is unsubstituted or substituted by further hydrocarbon radicals such as alkyl groups. Araliphatic radicals are preferably monocyclic aryl-lower aliphatic radicals. Aromatic nuclei can also be fused with the aza-cycloaliphatic ring.

The aza-cycloaliphatic radical present in the 3-position of the 25-O-desacetyl-3-amino-rifamycin compounds mentioned thus represents a saturated or unsaturated alkyleneamino group, which is unsubstituted or substituted by further hydrocarbon radicals, for example as described, which possesses at least 3 ring carbon atoms, and from the α- or α'-carbon atoms of which no double bond may start because of the condition mentioned that these carbon atoms are tetragonal. Preferably the alkyleneamino group possesses 3-11-ring carbon atoms. The above mentioned condition that a further carbon-carbon bond should be present in at least one of the positions other than the α- or α'-positions of the aza-cycloaliphatic ring provided this ring possesses fewer than 8 carbon atoms means that in at least one of these positions one of the above-mentioned substituents is present or that an endo-carbon-carbon bond or a ring-double bond starts from these positions. The alkylene-amino group is thus for example an azetidin-1-yl, pyrrolidino, piperidino, hexahydroazepin-1-yl, octahydroazocin-1-yl, octahydroazonin-1-yl, decahydroazecin-1-yl, aza-cycloundec-1-yl or aza-cycloduodec-1-yl radical which is if required substituted or possesses one or more double bonds as said above. One, two or more hydrocarbon radicals may be present as substituents, and optionally two identical or different groups may be present on one and the same ring carbon atoms of the aza-cycloaliphatic ring.

As preferred substituents of the aza-cycloaliphatic rings which have been mentioned, the following may be quoted: monovalent or divalent aliphatic hydrocarbon radicals, primarily those with 1–7 carbon atoms, that is to say lower alkyl groups such as methyl, ethyl, straight or branched propyl, butyl or pentyl groups bonded in any desired position, lower alkenyl groups such as vinyl, allyl or methallyl groups or lower alkylene groups with at most 1 carbon atoms, for example methylene, ethylene, propylene, butylene or pentylene radicals or cycloaliphatic hydrocarbon radicals, preferably with 3–8 ring carbon atoms, such as cycloalkyl groups, for example cyclopentyl or cyclohexyl groups, or cycloaliphatic-aliphatic hydrocarbon radicals, preferably with 3–8 ring carbon atoms and at most 7 chain carbon atoms such as cycloalkyl-lower alkyl groups, for example cyclopentylmethyl, cyclohexylmethyl, cyclohexylpropyl or cyclohexylethyl groups, or aromatic, especially monocyclic or bicyclic hydrocarbon radicals, such as phenyl or naphthyl groups, and araliphatic hydrocarbon radicals such as phenyl- or naphthyl-lower alkyl groups, for example benzyl, phenylethyl, diphenylmethyl or naphthylmethyl groups.

The cycloaliphatic and aromatic hydrocarbon substituents or fused cycloaliphatic and aromatic rings can in turn be substituted, for example by lower alkyl groups, preferably with up to 7 carbon atoms.

Amongst the monocyclic aza-cycloaliphatic substituents in the 3-position of the rifamycin compounds mentioned, the following should primarily be pointed out: an azetidin-1-yl (trimethyleneimine) radical which is substituted in the β-position and optionally also in the α-position, the pyrrolidino radicals which are monosubstituted or polysubstituted in the β-position and optionally also in the β'-position by lower alkyl groups such as methyl, ethyl, propyl, isopropyl, butyl or sec.- or tert.-butyl groups, and the derivatives which are additionally substituted in the α-position or in the α,α'-positions by one of the alkyl groups mentioned, as well as the piperidino radicals substituted in an analogous manner in α,β,γ-position and/or α',β'-position, and the analogous derivatives of hexahydro-1H-azepine or of octahydroazocine which are optionally also substituted in the γ,γ' and/or δ-position. As specific radicals there may for example be mentioned: the 3-methyl-azetidin-1-yl, the 3,3-dimethyl-azetidin-1-yl, the 3,3 - diethyl-azetidin-1-yl, the 3,3-diproplyl-azetidin-1-yl, the 3-isopropyl-3-phenyl-azetidin-1-yl, the 3-methyl-pyrrolidino, the 3,3-dimethyl-pyrrolidin-1-yl, the 2,4,5-trimethyl-piperidino, the 3,3, 4,4-tetramethyl-pyrrolidin-1-yl, the 4-ethyl-piperidino, the 2,3-dimethyl-piperidino, the 2,4-dimethyl-piperidino, the 2,5-dimethyl-piperidino, the 4-methyl-3-ethyl-piperidino, the 2,3,4-trimethyl-piperidino, the 3-benzyl-piperidino, the benzyl-piperidino, the 2-methyl-4-phenyl-piperidino, the 2-methyl-5-phenyl-piperidino, the 4-(2'-phenylethyl)-piperidino, the 3-methyl- or 4-methyl-piperidino, the 4-isopropyl-piperidino, the 3,3-dimethyl-piperidino, the 3,4-dimethyl-piperidino, the 3,5-dimethyl-piperidino, the 4,4-dimethyl-piperidino or the 4-ethyl-piperidino radical, and also the 3- or 4-methyl- or -ethyl-hexahydroazepin-1-yl, the 3,3-dimethyl- or 4,4-dimethyl-hexahydroazepin-1-yl, the 2,3,4-trimethyl- or -triethyl-hexahydroazepin-1-yl, the 3- or 4-methyl- or -ethyl-octahydro-azocin-1-yl, the 3,3-dimethyl- or 4,4-diethyl- or 5,5-dimethyl- or -diethyl-octahydroazocin-1-yl radical.

As further preferred possible substituents in the 3-position of the 25-O-desacetyl rifamycin compounds mentioned there should be mentioned the radicals the unsaturated derivatives of the unsubstituted aza-cycloaliphatic rings or of the aza-cycloaliphatic rings substituted by the above-mentioned hydrocarbon radicals, especially those with 4–11 ring carbon atoms, that is to say for example of pyrrolidine, piperidine, hexahydroazepine, octahydroazocine, octahydroazonine, decahydroazecine, aza-cycloundecane and aza-cycloduodecane.

The following may be mentioned particularly: the Δ³-pyrrolino and Δ³-piperidino (1,2,3,6-tetrahydro-pyridyl-1) radical and their derivatives which are for example substituted by lower alkyl or phenyl radicals as described above for the saturated compounds, for example the 4-methyl-Δ³-piperidino, the 3,4 - dimethyl-Δ³-piperidino, the 4-ethyl-Δ³-piperidino, the 3-methyl-Δ³-piperidino, the 3,5-dimethyl-Δ³-piperidino, the 4-propyl-Δ³-piperidino or the 4-isobutyl-Δ³-piperidino radical and the 4-phenyl-Δ³-piperidino radical.

Bicyclic aza-cycloaliphatic substituents in the 3-position of the rifamycin compounds mentioned, primarily those with 4–11 carbon atoms in the heterocyclic ring, are for example those which possess one or more fused aromatic nuclei. These nuclei can in turn be monocyclic or polycyclic and can optionally be substituted by further aliphatic, cycloaliphatic, araliphatic or aromatic hydrocarbon radicals, especially by lower alkyl radicals. Benzene and naphthalene nuclei should be particularly highlighted. Specific examples of aza-bicyclic or polycyclic cycloaliphatic hydrocarbon radicals of this type are: the isoindolin-2-yl, the benz[f]isoindolin-2-yl, the benz[e]isoindolin-2-yl, the 1,2,3,4-tetrahydro-isoquinol-2-yl, the 2,3,4,5-tetrahydro-1H - 2 - benzazepin-2-yl, the 2,3,4,5-tetrahydro-1H-3-benzazepin-3-yl, the 1,2,3,4,5,6-hexahydro - 2 - benzazocin-2-yl, the 1,2,3,4 - tetrahydro-benz[h]isoquinol-2-yl or the 2,3-dihydro-1H-benz[de]isoquinol-2-yl, the 6,7-dihydro-5H-dibenz[c,e]azepin-6-yl, or the 5,6,7,8-tetrahydro-dibenz[c,e]azocin-6-yl radical.

Cycloaliphatic rings which are fused to the aza-cycloaliphatic ring in the 3-position of the desacetyl-rifamycin constituent are those of cycloalkanes or cycloalkenes with preferably 3–8 carbon atoms, such as for example cyclopropane, cyclobutane, cyclopentane or cyclohexane rings which can in turn be substituted, especially by lower alkyl radicals such as methyl groups. Such condensed ring systems are bicyclic or polycyclic aza-cycloaliphatic hydrocarbon radicals such as azabicyclo- or azatricyclo-alkyls or -alkenyls. These however also result from bridging two carbon atoms at a time of the aza-cycloaliphatic ring, for example of the above-mentioned pyrrolidine, piperidine, hydroazepine or hydroazocine rings, by means of a single carbon-carbon bond or by means of straight or branched lower aliphatic alkylene radicals such as the methylene or the ethylene, propylene, butylene or pentylene radicals or by means of alkylidene radicals such as the isopropylidene radical. Such radicals are for example the octahydroindol-1-yl, octahydroisoindol - 2 - yl, decahydro-cyclohepta[b]pyrrol - 1 - yl, the decahydro-cyclohepta[c]-pyrrol-2-yl, the decahydro-5H-cyclohepta[b]-pyrid-1-yl, the decahydro-1H-cyclohepta[c]-pyrid-2-yl, the decahydro-cyclopent[c]-azepin-2-yl, the decahydrocyclopent[d]-azepin-3-yl, the 10-azabicyclo[4.3.1]-dec-10-yl, the 8-azabicyclo[4.3.1]-dec-8-yl, the decahydroquinol-1-yl and -isoquinol-2-yl, the 2-azabicyclo[2.2.0]-hexy-2-yl, the 2-azabicyclo[3.2.0]-hept-2-yl, the 7-azabicyclo[4.2.0]-oct-7-yl, the 2-azabicyclo[4.3.1]-dec-2-yl, the 9-azabicyclo[3.3.2]-dec-9-yl, the 11-azabicyclo[4.4.1]-undec - 11 - yl, the 3-azabicyclo[4.1.0]hept-3-yl, the 3-azabicyclo[3.2.0]-hept-3-yl, the 3-azabicyclo[3.1.1]-hept-3-yl, the 7-azabicyclo[2.2.1]-hept-7-yl, the 2-azabicyclo[2.2.1]-hept - 2 - yl, the 7-azabicyclo[2.2.1]-hept-7-yl, the 3-azabicyclo[3.1.0]-hex-3-yl, the 3-azabicyclo[3.3.0]-oct-3-yl, the 9 - azabicyclo[4.2.1]-non-9-yl, the 9-azabicyclo[3.3.1]-nonyl - 9 - yl, the 2-azabicyclo[3.3.1]-non-2-yl, the 3-azabicyclo[3.3.1]-non-3-yl, the 2-azabicyclo[3.2.2]-non - 2 - yl, the 9-azabicyclo[3.3.1]-non-2-en-9-yl, the 2-azabicyclo[3.2.2]-nona - 5,7,8 - trien-2-yl, the 2 - azabicyclo[3.2.2]-nona-3,5,7,8-tetraen-2-yl, the 2-azabicyclo[4.2.0]-oct-2-yl, the 3-azabicyclo[4.1.1]-oct-3-yl, the 8-azabicyclo[3.2.1]-oct-8-yl, the 8-azabicyclo[3.2.1]-oct-2-en-8-yl, the 6-azabicyclo[3.2.1]-oct-6-yl, the 4-azabicyclo[5.4.0]-undec-4-yl, the 7-azabicyclo[4.3.0]-non-3-en-7-yl, the 8-azabicyclo[4.3.0]-non-3-en-8-yl, the 8-azabicyclo[4.3.0]-non-1(6)-en-8-yl, the 1,8,8-trimethyl-3-azabicyclo-[3.2.1]-oct-3-yl, the 9-azabicyclo[4.2.1]-nona-2,4-dien-9-yl, the 3-azabicyclo[4.4.0]-dec-1(6)-en-3-yl, the 2-azabicyclo[3.2.1]-oct-2-yl, the 3-azabicyclo[3.2.1]-oct-3-yl, the 2-azabicyclo[2.2.2]-oct-2-yl, the 2-azabicyclo[2.2.2]-octa-4,6,7-trien-2-yl, the 2-azabicyclo[4.3.0]-non-2-yl, the 7 - azatricyclo[3.3.0.0$^{1,3}$]-oct-7-yl, the 3-azatricyclo[3.2.1.0$^{2,4}$]-oct-3-yl, the 4,7-methano-3a,4,7,7a-tetrahydro-isoindolin-2-yl, the 4,7-methano-3a,4,5,6,7,7a-hexahydro-isoindolin-2-yl, the 1,5-methano-cyclopent[c]1,2,3,4,5,5a,6,8a-octahydroazepin - 2 - yl, the 1,5-methano-cyclopent[d]decahydro-azepin-3-yl and the 1H-methano-3,4,5,6-tetrahydro-3-benzazocin-3-yl radical.

Finally, spirocyclic aza-hydrocarbons radicals should also be mentioned, such as for example, the 2-azaspiro-[3.3]hept-2-yl, 1-azaspiro[4.5]dec-1-yl, the 2-azaspiro-[4.5]dec-2-yl, the 8-azaspiro[4.5]dec-8-yl, the 5-azaspiro-[2.4]hept-5-yl, the 5-azaspiro[2.4]hept-4-en-5-yl, the 2-azaspiro[4.4]non-2-yl, the 2-azaspiro[4.6]undec-2-yl, the 1-azaspiro[5.5]undec-1-yl, the 3-azaspiro[5.5]dec-3-yl, the 3-azaspiro[5.5]undec-3-yl, the 6-azaspiro[2.5] oct-6-yl, the 2-azaspiro[3.4]oct-2-yl, the 6-azaspiro[3.4] oct-6-yl, the 2-azaspiro[3.5]non-2-yl, the 7-azaspiro[3.5] non-7-yl, the 3-azaspiro[5.6]dodec-3-yl, the 6-azaspiro-[4.4]oct-6-yl, the 3-azaspiro[5.5]undec-7-en-3-yl radical and those which also contain an aromatic nucleus such as the spiro[cyclohexene-1,1'(2'H)-isoquinol-2'-yl], the spiro[naphthalene-1(4H), 3'-piperid-1'-yl], the spiro-[naphthalene-1(2H), 4'-piperid-1'-yl], the spiro[cyclohexane-1,4'(1'H)-quinol-1'-yl], the spiro[cyclohexane-1, 4'(3'H)-isoquinol-2'-yl] or the spiro[naphthalene-2(1H), 4'-piperid-1'-yl] radical.

Of the new compounds of the present application the following should be particularly highlighted:

25-desacetyl-3-(3'-methyl-piperidino)-rifamycin SV,
25-desacetyl-3-(4'-methyl-piperidino)-rifamycin SV,
25-desacetyl-3-(3',4'-dimethylpiperidino)-rifamycin SV,
25-desacetyl-3-(3',5'-dimethyl-piperidino)-rifamycin SV,
25-desacetyl-3-(4',4'-dimethylpiperidino)-rifamycin SV,
25-desacetyl-3-(3'-methyl-pyrrolidino)-rifamycin SV,
25-desacetyl-3-(4'-ethyl-piperidino)-rifamycin SV, 25-desacetyl-3-(4'-isopropyl-piperidino)-rifamycin SV,
25-desacetyl-3-(3',3'-dimethyl-pyrrolidino)-rifamycin SV,
25-desacetyl-3-(3'-methyl-3'-ethyl-piperidino)-rifamycin SV,
25-desacetyl-3-(4'-tert.butyl-piperidino)-rifamycin SV,
25-desacetyl-3-(3',3'-dimethyl-piperidino)-rifamycin SV,
25-desacetyl-3-(4'-phenyl-piperidino)-rifamycin SV,
25-desacetyl-3-(3'-phenyl-pyrrolidine)-rifamycin SV,
25-desacetyl-3-(4'-cyclohexyl-piperidino)-rifamycin SV,
25-desacetyl-3-(3'-cyclohexyl-pyrrolidino)-rifamycin SV,
25-desacetyl-3-(4'-benzyl-piperidino)-rifamycin SV,
25-desacetyl-3-(isoindolin-2-yl)-rifamycin SV,
25-desacetyl-3-(octahydroisoindol-2-yl)-rifamycin SV,
25-desacetyl-3-(1',2',3',4'-tetrahydroisoquinol-2'-yl)-rifamycin SV,
25-desacetyl-3-(4'-cyclohexylpropyl-piperidino)-rifamycin SV,
25-desacetyl-3-(4'-cyclohexylmethyl-piperidino)-rifamycin SV,
25-desacetyl-3-(4'-tert.-butyl-hexahydroazepino)-rifamycin SV,
25-desacetyl-3-(3'-aza-bicyclo[3'2'1']-oct-3'-yl)-rifamycin SV,
25-desacetyl-3-(1',8',8'-trimethyl-3'-aza-bicyclo[3',2',1']-oct-3'-yl)-rifamycin SV and the corresponding rifamycin S derivatives.

The new compounds of the present invention exhibit in addition to a very good action against gram-positive microorganisms, which is for example expressed, when determined in vitro (dilution test) with *Staphylococcus aureus* SG 511 by a minimum inhibitory concentration in the range of 0.0001–0.02 mcg./ml., also an antibacterial action against rifampicin-resistant Staphylococci and corresponding mutants of *Mycobacterium tuberculosis*. Rifampicin, that is to say 3-(4'-methyl-1'-piperazinyliminomethyl)-rifamycin SV, is one of the most active rifamycin derivative. The new 25-O-desacetyl-3-amino-rifamycin compounds of the present invention furthermore show, at a selection concentration of 100 mcg./ml. a 100-fold lower mutation rate to resistance in the case of gram-positive microorganisms as compared to rifampicin.

There is especially to be mentioned e.g. the 25-O-desacetyl-3-(4'-methyl piperidino)-rifamycin SV which shows a minimum inhibitory concentration in the dilution test in vitro against *Staphylococcus aureus* SG 511 of about 0.05 γ/ml. and a minimum inhibitory concentration of 40 γ/ml. against rifampicin-resistant clones of *Staphylococcus aureus* SG 511 in vitro, which have been selected by addition of rifampicin to sensitive populations of this microorganism of the above-mentioned concentration. The corresponding values for the 25-O-desacetyl-3-isopropylpiperidino-rifamycin SV are as follows:

minimum inhibitory concentration against sensitive strains of *Staphylococcus aureus* SG 511 0.068 γ/ml.,
minimum inhibitory concentration against resistant strains of *Staphylococcus aureus* selected by addition of rifampicin to sensitive populations in the above mentioned concentration of 10 γ/ml.

The new compounds according to the invention are also less toxic than the corresponding 25-acetylated derivatives and are much more soluble in water and saline solutions, which makes them particularly suitable for use as anti-bacterial chemotherapeutics especially for parenteral administration. They can also be used as additives for fodder, and for preserving victuals, and also as disinfectants. Finally the new compounds can however also be used as valuable intermediates for the manufacture of other useful substances, especially such having pharmacological activity.

The new compounds can optionally also be present in the form of their tautomers.

The new 3-amino derivatives of 25-O-desacetyl-rifamycin S or their derivatives (quinone form) are compounds of a violet red color which are soluble in most organic solvents such as alcohols, halogenated hydrocarbons, esters, dioxan and the like. They can be reduced by the usual reducing agents, for example hydrosulphite-, dithionite or especially ascorbic acid to give yellow-colored, mostly crystalline, hydroquinones. In alkaline solution the hydroquinones very easily change into the quinones, and the oxidation can also be brought about by the reagents which are usual for the known hydroquinones such as ammonium persulphate, potassium ferricyanide, hydrogen peroxide or also merely by air.

Amongst the quaternary ammonium compounds of the 25-O-desacetyl-3-amino-rifamycin derivatives, the chloromethylates and bromomethylates and the mesyl- or tosyl-methyl compounds may be especially mentioned.

The salts of the new compounds can also serve for the purification of the resulting bases, by converting the bases into salts, separating these off and again liberating the bases from the salts. Because of the close relationship between the bases in the free form and in the form of their salts, the free bases are, in the preceding and following text, where appropriate also to be understood as the corresponding salts, in respect of sense and purpose.

The new compounds can be manufactured according to the process described and claimed in copending application Ser. No. 5,899 filed Jan. 26, 1970 for the preparation of 3-amino-rifamycin S and -SV derivatives (cf. also French Pat. 1,490,183) or by deacylating in 25-position the corresponding 3-amino-rifamycin compounds described in the said U.S. application by mild alkaline hydrolysis.

According to the first named process adapted to the preparation of the compounds of the present invention the 25-O-desacetyl-rifamycin S or SV compound or its derivatives at least partialy hydrogenated in one of the 16, 17; 18, 19; or 28, 29 positions, is treated with the desired amine and the resulting 3-amino substitution product is isolated in the quinone or hydroquinone form and/or, if desired, the isolated compounds are hydrogenated with catalytically activated hydrogen and/or any hydroquinone obtained is oxidised at any stage to the corresponding quinone and/or any quinone obtained is reduced at any stage to the corresponding hydroquinone and/or, if desired, any resulting compound is converted into its salt or quaternary ammonium compound.

The reaction with the amine is appropriately carried out in a solvent which is free of hydroxyl groups, for example chloroform, methyl Cellosolve, or tetrahydrofurane, but especially a non-polar solvent, for example aromatic hydrocarbons such as benzene, or preferably in dioxane. In the later solvent, the reaction is generally complete in about 5–10 minutes. It has been found that the reaction speed also depends on the structure of the amine. A large excess (5–10 mols) of amine is appropriately used. The reaction is advantageously carried out at room temperature or—where it takes place slowly—at elevated temperature. The course of the reaction can be followed by thin layer chromatography. The reaction product is in general present in the reaction solution partly in the form of the quinone and partly in the form of the hydroquinone. It is advantageous to oxidise the product in the reaction solution completely to the quinone and to isolate the latter. The oxidation is advantageously performed with inorganic oxidising agents, for example hydrogen peroxide or ammonium persulphate but preferably with potassium ferricyanide. The quinone can be extracted by means of organic solvents. The conversion of quinones and hydroquinones into one another which is optionally to be carried out after the isolation can be carried out according to the methods discussed above.

The hydrogenation of the aliphatic side chain in the rifamycin component, which is to be carried out in accordance with the invention, can advantageously be carried out with catalytically activated hydrogen, for example using palladium or platinum catalysts, or by means of Raney nickel.

The saponification of the 25-acetyl group in the 3-aminorifamycin compound corresponding to the compounds of the present invention takes place in a manner which is in itself known and is appropriately carried out with mild alkalis, for example with an alkali bicarbonate, alkali carbonate or hydroxide or an organic base. These alkaline agents are preferably employed in an aqueous organic solvent, such as an alcohol, for example methanol or ethanol or dioxan, and the solution is either boiled under reflux for several hours or is allowed to stand at room temperature depending on the strength of the hydrolysing agent used.

After hydrolysis interconversion of quinones and hydroquinones and/or salifications as described above may optionally be carried out.

The new compounds can for example be used in the form of pharmaceutical preparations. These contain the compounds mixed with a pharmaceutical organic or inorganic, solid or liquid excipient suitable for enteral, topical or parenteral administration. Suitable substances for forming the latter are those which do not react with the new compounds such as for example water, gelatine, lactose, starch, stearyl alcohol, magnesium stearate, talc, vegetable oils, benzyl alcohols, gum, propylene glycol, polyalkylene glycols, white petroleum jelly, cholesterol or other known medicinal excipients. The pharmaceutical preparations can for example be in the form of tablets, dragees, ointments, creams or capsules, or in a liquid form as solutions, suspensions or emulsions. They are optionally sterilised and/or contain auxiliary substances such as preservatives, stabilisers, wetting agents, or emulsifiers, solubilising agents or salts for regulating the osmotic pressure or buffers. They can also contain yet further therapeutically valuable substances. The preparations are formulated according to usual methods.

The new compounds can also be used in veterinary medicine, for example in one of the above-mentioned forms.

The invention is described in the examples which follow:

EXAMPLE 1

A solution of 3.3 g. (0.005 mol) of 25-desacetyl-rifamcyin S in 10 ml. of dioxane is mixed with 5 g. (0.04 mol) of 4-isopropylpiperidine and left to stand at 20° C. until the reaction mixture which is initially deep violet in colour has assumed an orange-yellow colour. The reaction mixture is now diluted with water, acidified to pH 5 and extracted with chloroform. The chloroform extract is stirred for one hour with an excess of aqueous potassium ferricyanide solution which has been rendered alkaline with bicarbonate, and thereafter the chloroform phase is separted off and evaporated. The residue is chromatographed on 300 g. of triethylamine-impregnated silica gel using chloroform as the eluting agent. A red band and a dark violet band are observed. The eluate of the latter is evaporated and the evaporation residue is crystallised from ether. The crystals thereby obtained are subsequently still recrystallised from methanol and then melt at 208–209° C. with decomposition.

Ultraviolet spectrum in ethanol, $m\mu$ (log $\epsilon$): 218 (4.45), 271 (4.47), 325 (4.18), ~390 (shoulder), 550 (3.42).

Infrared spectrum in $CH_2Cl_2$, cm.$^{-1}$: 3500, 3400, 1730, 1680, 1620 etc.

EXAMPLE 2

5 g. of 3-(4'-tert.butyl-piperidino)-rifamycin S are dissolved in 250 ml. of dioxan. While stirring there are added to this soltuion 25 ml. of 10% sodium hydroxide solution and sufficient water to obtain a clear solution. After two hours the solution is acidified with citric acid, diluted with water and extracted three times with chloroform. The chloroform extract is dried and evaporated and the dark residue so obtained is crystallized from methanol yielding black crystals of 25-O-desacetyl-3-(4'-tert.butyl-piperidino)-rifamycin S melting at 165–166° C.

EXAMPLE 3

5 g. 3-(4'-methyl-1'-azacyclohept-1'-yl)-rifamycin SV is dissolved in 250 ml. of dioxan. While stirring there are added to this solution 25 ml. of 10% sodium hydroxide solution and sufficient water to obtain a clear solution. After two hours the solution is acidified with citric acid, diluted with water and extracted three times with chloroform. The chloroform extract is dried and evaporated and the yellow resin so obtained is crystallized from methanol yielding yellow crystals of the 25-O-desacetyl-3-(4'-methyl - 1'-azacyclohept-1'-yl)-rifamycin-SV melting at 237°.

EXAMPLE 4

Pharmaceutical preparations containing 3-(4'-isopropylpiperidino)-25-O-desacetyl-rifamycin SV as an antibiotic for parenteral administration:

100 mg. of 3-(4'-isopropylpiperidino)-25-O-desacetyl-rifamycin SV in the form of the sodium salt are dissolved in 1 ml. of distilled water. This solution is lyophilised at $-30°$ C. The dry product thus obtained is used for the manufacture of injection solutions by dilution, for example with 50 ml. of distilled water or 100 ml. of physiological sodium chloride solution.

EXAMPLE 5

Pharmaceutical preparation containing 25-O-desacetyl-4'-tert.butyl-piperidino-rifamycin SV as the antibiotic in the form of push-fit capsules.

Composition

| | Mg. |
|---|---|
| 25 - O - desacetyl-(4'-tert.butyl)-piperidino-rifamycin SV | 300 |
| Ethylcellulose | 3 |
| Stearic acid | 3 |
| | 306 |

Manufacture (I) Ethylcellulose and stearic acid are dissolved in a 20-fold amount of methylene chloride.

(II) 25-O-desacetyl-(4'-tert.butyl-piperidino) - rifamycin SV is homogeneously mixed with Solution I in a suitable mixer, subsequently forced through a sieve of 3–5 mm. mesh width, and dried at a temperature not exceeding 40° C.

(III) The dry granular material II is forced through a sieve of 0.5 mm. mesh width and is filled in the usual manner into gelatine push-fit capsules of size 1 (=0.5 cm.²).

EXAMPLE 6

25-desacetyl-rifamycin S is reacted with 4-methylpiperidine as described in Example 1 and the reaction product is also worked up as indicated in that Example. There is thus obtained 25-desacetyl-3-(4'-methylpiperidino)-rifamycin S melting at 235–236° C.

What is claimed is:

1. A member selected from the group consisting of a 25-O-desacetyl-3-amino-rifamycin S, 25-O-desacetyl - 3-amino-rifamycin SV and their 16,17; 18,19-tetrahydro or 16,17; 18,19; 28,29-hexahydro derivatives, wherein the 3-amino group is selected from among the group consisting of (1) N-azacycloalkyl having 3 to 11 ring carbon atoms; (2) N-azacycloalkenyl having 3 to 11 ring carbon atoms; (3) N-azacycloalkyl or N-azacycloalkyenyl having 3 to 11 ring carbon atoms substituted by a member selected from the group consisting of phenyl, lower alkyl-phenyl, lower alkenyl with at most 7 carbon atoms or a cycloaliphatic or cycloaliphatic-aliphatic hydrocarbon radicals with 3 to 8 ring carbon atoms and at most 7 carbon atoms in the aliphatic moiety; (4) N-azabicyclo or N-azatricycloalkyl or N-azabicyclo or N-azatricycloalkenyl having 4 to 11 carbon atoms in the heterocyclic ring; (5) N-spiro-aza-cycloalkyl or N-spiro-aza-cycloalkenyl having 7 to 12 ring carbon atoms and (6) an N-azacycloalkyl having 4 to 11 ring carbon atoms fused with 1 or 2 benzene nuclei or with a naphthalene nucleus, with the proviso that the said aza-cycloaliphatic ring possesses only tetragonal α-carbon atoms and, if it has fewer than 8 ring carbon atoms, it possesses additionally a further carbon-carbon bond starting from at least one of the positions other than the α-positions, their therapeutically acceptable salts and quaternary ammonium compounds.

2. A compound as claimed in claim 1, wherein the 3-amino group is an alkyleneamino group having from 3 to 11 ring carbon atoms.

3. A compound as claimed in claim 1, wherein the 3-amino group is an alkyleneamino group with 3 to 11 ring carbon atoms whose alkylene radical is substituted by at least one hydrocarbon radical selected from the group consisting of lower alkyl-, lower alkenyl, lower alkylidene, lower alkylene, cycloalkyl and cycloalkenyl with 3–8 ring carbon atoms, phenyl, lower alkylphenyl and phenyl lower alkyl.

4. A compound as claimed in claim 1, wherein the 3-amino group is an alkyleneamino group with 4 to 11 ring carbon atoms whose alkylene radical is fused with one or more phenylene radicals.

5. A compound as claimed in claim 1, wherein the 3-amino group is an alkyleneamino group with 4 to 11 ring carbon atoms whose alkylene radical is fused with one or more cycloaliphatic hydrocarbon radicals having 3–8 carbon atoms.

6. A compound as claimed in claim 1, wherein the 3-amino group is an alkyleneamino group with 3–1 carbon atoms, whose alkylene radical is spirocyclically substituted by at least another alkylene group having from 1 to 7 carbon atoms.

7. A compound as claimed in claim 1, wherein the 3-amino group is a member selected from the group consisting of a pyrrolidino radical substituted by at least one lower alkyl group in any of the positions $\beta$- and $\beta'$- and a pyrrolidino radical so substituted and substituted moreover in one of the α- and α'-positions.

8. A compound as claimed in claim 1, wherein the 3-amino group is a member selected from the group consisting of a piperidino radical substituted by at least one lower alkyl group in any of the $\beta$-, $\gamma$- and $\beta'$-positions and a pyrrolidino group so substituted and substituted moreover in one of the α- and α'-positions.

9. A compound as claimed in claim 1, wherein the 3-amino group is a member selected from the group consisting of a hexahydroazepin-1'-yl radical substituted by at least one lower alkyl group in any of the positions $\beta$, $\gamma$, $\gamma'$ and $\beta'$ and a hexahydroazepin-1'-yl radical so substituted and substituted moreover in one of the α- and α'- positions.

10. A compound as claimed in claim 1, wherein the 3-amino group is a member selected from the group consisting of an azabicyclohexyl-, an azabicycloheptyl, an azabicyclooctyl and an azabicyclo-nonyl radical and derivatives of such radicals unsaturated in the rings.

11. A compound as claimed in claim 1 wherein the compound is a member selected from the group consisting of the 25-O-desacetyl-3-(4'-methyl-piperidino)-rifamycin S and the 25-O-desacetyl-3-(4'-methyl-piperidino)-rifamycin SV and its sodium salt.

12. A compound as claimed in claim 1 wherein the compound is a member selected from the group consisting of the 25-O-desacetyl-3-(4'-isopropyl-piperidino)-rifamycin S and 25-O-desacetyl-3-(4'-isopropyl-piperidino) - rifamycin SV and its sodium salt.

13. A compound as claimed in claim 1 wherein the compound is a member selected from the group consisting of the 25-O-desacetyl-3-(4'-tert.butyl-piperidino)-rifamycin S and the 25-O-desacetyl-3-(4'-tert.butyl - piperadino)-rifamycin SV and its sodium salt.

14. A compound as claimed in claim 1 wherein the compound is a member selected from the group consisting of the 25-O-desacetyl-3-(4'-methyl-1'-azacyclohept - 1' - yl)-rifamycin S and the 25-O-desacetyl-3-(4'-methyl-1'-azacyclohept-1'-yl)-rifamycin SV and its sodium salt.

References Cited
UNITED STATES PATENTS 3,524,845　8/1970　Bickel et al. _____ 260—210 AB

FOREIGN PATENTS 1,161,908　8/1966　Great Britain _____ 260—210 AB
1,445,997　3/1969　Germany _____ 260—210 AB ELBERT L. ROBERTS, Primary Examiner J. R. BROWN, Assistant Examiner U.S. Cl. X.R.

424—285

PO-1050
(5/69)

UNITED STATES PATENT OFFICE
CERTIFICATE OF CORRECTION

Patent No. 3,738,980          Dated  June 12, 1973

Inventor(s)   HANS BICKEL ET AL

It is certified that error appears in the above-identified patent and that said Letters Patent are hereby corrected as shown below:

Column 9, line 34,  "3-1" should read -- 3-11 --.

Signed and sealed this 16th day of April 1974.

(SEAL)
Attest:

EDWARD M.FLETCHER,JR.
Attesting Officer

C. MARSHALL DANN
Commissioner of Patents df